(12) United States Patent
Prados (10) Patent No.: US 7,834,857 B2
(45) Date of Patent: Nov. 16, 2010

(54) INPUT DEVICE HAVING A TOUCH PANEL AND HAPTIC FEEDBACK

(75) Inventor: Michael Prados, San Francisco, CA (US)

(73) Assignee: Volkswagen AG, Wolfsburg (DE)

( * ) Notice: Subject to any disclaimer, the term of this patent is extended or adjusted under 35 U.S.C. 154(b) by 712 days.

(21) Appl. No.: 11/531,125

(22) Filed: Sep. 12, 2006

(65) Prior Publication Data

US 2007/0057927 A1    Mar. 15, 2007

Related U.S. Application Data (60) Provisional application No. 60/728,656, filed on Oct. 20, 2005, provisional application No. 60/717,088, filed on Sep. 14, 2005.

(51) Int. Cl.
*G06F 3/041* (2006.01)

(52) U.S. Cl. ...................................................... 345/173

(58) Field of Classification Search .................. None
See application file for complete search history.

(56) References Cited

U.S. PATENT DOCUMENTS

| | | | | |
|---|---|---|---|---|
| 4,885,565 A | | 12/1989 | Embach ...................... 340/407 |
| 4,980,936 A | * | 1/1991 | Frickland et al. ................ 5/420 |
| 5,319,582 A | * | 6/1994 | Ma ............................. 345/169 |
| 5,771,152 A | * | 6/1998 | Crompton et al. ....... 361/679.27 |
| 5,988,902 A | | 11/1999 | Holchan ................... 400/479.1 |
| 6,118,435 A | | 9/2000 | Fujita et al. ................. 345/173 |
| 6,429,846 B2 | | 8/2002 | Rosenberg et al. ........... 345/156 |
| 6,625,011 B2 | * | 9/2003 | Hyun ...................... 361/679.11 |
| 6,633,347 B2 | * | 10/2003 | Kitazawa ..................... 348/837 |
| 6,746,065 B1 | * | 6/2004 | Chan ........................ 296/24.34 |
| 6,822,635 B2 | * | 11/2004 | Shahoian et al. ............. 345/156 |
| 2002/0021282 A1 | * | 2/2002 | Masudaya .................... 345/156 |
| 2002/0033795 A1 | * | 3/2002 | Shahoian et al. ............. 345/156 |
| 2003/0025367 A1 | * | 2/2003 | Boudinot ................. 297/217.3 |
| 2003/0067449 A1 | * | 4/2003 | Yoshikawa et al. .......... 345/173 |
| 2005/0219206 A1 | | 10/2005 | Schena et al. ................ 345/156 |

FOREIGN PATENT DOCUMENTS

| | | |
|---|---|---|
| DE | 19731285 A1 | 7/1997 |
| DE | 20180024 U1 | 1/2001 |
| DE | 20102197 U1 | 2/2001 |
| DE | 20022244 U1 | 11/2001 |
| EP | 15060102 A2 | 11/2004 |
| JP | 09235477  * | 9/1997 |
| WO | 9721160 | 6/1997 |
| WO | 9808241 | 2/1998 |
| WO | 9926230 | 5/1999 |
| WO | 0154109 A1 | 7/2001 |
| WO | 03003880 A1 | 5/2003 |
| WO | 03041046 A1 | 5/2003 |

OTHER PUBLICATIONS www.3m.com Touchscreens from 3MTM.

* cited by examiner

*Primary Examiner*—Alexander Eisen
*Assistant Examiner*—Matthew Yeung
(74) *Attorney, Agent, or Firm*—King & Spalding L.L.P.

(57) ABSTRACT

An input device, especially for a vehicle, includes a housing, a display arranged in the housing for optical display of information, a touchscreen arranged above the display to enter commands by touching an operating surface of the touchscreen, an actuator arranged in the housing to move the touchscreen or housing in at least one direction, a control arranged in the housing to drive the actuator when the operating surface is touched in a region prescribed for haptic feedback and an interface for output of information via a command entered by touching the operating surface of the touchscreen.

34 Claims, 9 Drawing Sheets

FIG. 17

INPUT DEVICE HAVING A TOUCH PANEL AND HAPTIC FEEDBACK

CROSS-REFERENCE TO RELATED APPLICATIONS

This application claims the benefit of U.S. Provisional Application No. 60/728,656 filed on Oct. 20, 2005, entitled "EINGABEVORRICHTUNG" and U.S. Provisional Application No. 60/717,088 filed on Sep. 14, 2005, entitled "EING-ABEVORRICHTUNG FUR BIN KRAFTFAHRZEUG".

TECHNICAL FIELD

The invention concerns an input device, especially for a vehicle, with a touchscreen.

BACKGROUND

A touchscreen is known, for example, from DE 20 02 197 U1 (incorporated by reference). A touchscreen for display of electronic signals and a confirming touch input of characters and symbols, consisting of a functional level for display and key input and a higher order, point-deformable protective level corresponding to it, are disclosed in DE 201 02 197 U1. In this case, through selection of specific points of the functional level by touching above the protective level, at least one confirmation signal for the touch sense (haptic stimulation) of the user is detectable at the position of the contact point in the deformed protective level is generated and the confirmation signal for the touch sense (haptic stimulation) is generated by oscillation elements arranged eccentrically within and/or beneath the functional level. In addition, in the touchscreen known from DE 201 02 197 U1, transmission of the generated vibrations from the functional level to the protective level occurs by direct contact of the two levels and/or over the edge regions of the levels by rigid or elastic connection elements.

Touchscreens are also known from U.S. Pat. No. 4,885,565 and EP 920 704 B1. Appropriate touchscreens, for example, touchscreens from 3M™ (see www.3m.com) can be purchased. Additional details concerning touchscreens can be derived from EP 1 560 102 A1.

A touch control with haptic feedback to input signals to a computer and to output forces to a user of the touch control is known from DE 201 80 024 U1 and the corresponding WO 01/54109 A1 (incorporated by reference), in which the touch control has a touch input device, which has a roughly flat contact surface, operated so that it enters a position signal into a processor of the computer based on a position on the contact surface that the user touches, in which the position signal indicates the position in two dimensions. The touch control according to WO 01/54109 A1 also has at least one actuator connected to the touch input device, in which the activator sends a force to the touch input device, in order to furnish a haptic sensation to the user touching the contact surface, in which the actuator sends the force directly to the touch input device based on force information sent by the processor.

Haptic feedback is also known from U.S. Pat. No. 6,429, 846, WO 03/038800 A1 (incorporated by reference), U.S. Pat. No. 5,988,902, WO 99/26230 A1 (incorporated by reference), WO 97/21160 A1 (incorporated by reference), DE 200 22 244 U1 (incorporated by reference) and WO 03/41046 A1 (incorporated by reference).

U.S. Pat. No. 6,118,435 discloses a touch panel.

An operating element for a device with several selectable menus, functions and/or functional levels is known from DE 197 31 285 A1, which has a surface that can be grasped by the operator, and via which selection can be carried out by local movement or touching of the surface. The surface is variable in configuration, corresponding to the selected and/or selectable menu, function and/or function value.

PCT/EP2005/008634 describes an operating device to operate a computer device, especially an operating device to operate a computer device to control functions in a vehicle, in which the operator device includes a display for optical display of information, a touchscreen arranged above the display to input commands by touching the touchscreen or by pressing on the touchscreen, and an actuator to move the touchscreen, and in which the operating device has an internal control to drive the actuator to move the touchscreen when the touchscreen is touched or when the touchscreen is pressed in a region of the touchscreen provided for haptic feedback.

SUMMARY

The task of the invention is to improve an input device with a touchscreen. It is desirable to create an input device that is especially suitable for vehicles. The costs for the input devices, in particular, are to be reduced.

The aforementioned task is solved by an input device, especially for a vehicle, in which the input device [includes] a housing, a display arranged in the housing for optical display of information, a touchscreen arranged above the display to input commands by touching an operating surface of the touchscreen, an actuator arranged in the housing, or at least partly in the housing, to move the touchscreen or housing in at least one direction, a control arranged in the housing to drive the actuator when the operating surface is touched in a region provided for haptic feedback, and an interface to output information concerning a command entered by touching the operating surface of the touchscreen.

A touchscreen according to the invention is especially a transparent touchscreen. A display according to the invention is especially a display or matrix display for variable display of information. A display according to the invention can be a TFT, for example.

In one embodiment of the invention, the control includes a circuit to evaluate an output signal of the touchscreen and/or a circuit to control the display.

In another embodiment of the invention, the control is configured as a printed circuit board. In one embodiment of the invention, this printed circuit board includes a circuit to evaluate an output signal of the touchscreen and/or a circuit to control a display.

A circuit according to the invention is also supposed to include an embodiment in the form of an ASICS or a correspondingly programmed processor.

In another embodiment of the invention, the input device includes an internal housing arranged in the housing, in which the display is arranged in the internal housing. In another embodiment of the invention, the internal housing is movable relative to the display. In another embodiment of the invention, the touchscreen is fastened to the internal housing, especially on the outside. In another embodiment of the invention, the touchscreen by the internal housing is movable parallel to the operating surface of the touchscreen. In another embodiment of the invention, the internal housing includes a transparent region. In another embodiment of the invention, the internal housing is transparent (at least) in the region of the touchscreen. In another embodiment of the invention, the touchscreen is part of the internal housing. In another embodiment of the invention, the touchscreen of the internal housing is movable by means of the actuator relative to the display, especially only along a straight line. In this case, the touchscreen or the internal housing is movable in another embodiment of the invention, parallel to an operating surface of the touchscreen. In another embodiment of the invention, the touchscreen or the internal housing is movable relative to the display only with one degree of freedom.

In another embodiment of the invention, the internal housing has at least one opening covered by a flexible sleeve. In this case, it is provided, in particular, that the display has a fastening element guided through the opening to fasten the display.

In another embodiment of the invention, the housing is movable relative to the display. In another embodiment of the invention, the touchscreen is fastened to the housing, especially on the outside. In another embodiment of the invention, the touchscreen or the housing is movable relative to the operating surface of the touchscreen. In another embodiment of the invention, the housing includes a transparent region. In another embodiment of the invention, the housing is transparent (at least) in the region of the touchscreen. In another embodiment of the invention, the touchscreen is part of the housing.

In another embodiment of the invention, the touchscreen or the housing is movable by means of the actuator relative to the display, especially only along a straight line. In this case, the touchscreen or the housing is movable, in another embodiment of the invention, parallel to an operating surface of the touchscreen. In another embodiment of the invention, the touchscreen or the housing is movable relative to the display only with one degree of freedom.

In another embodiment of the invention, the input device includes a flexible element arranged between the display and the touchscreen to prevent penetration of particles between the display and the touchscreen. In another embodiment of the invention, the flexible element has a rigidity adjusted to a weight of the touchscreen, so that the touchscreen, in conjunction with the flexible element, has a mechanical natural frequency between 5 Hz and 150 Hz.

In another embodiment of the invention, the flexible element is foamed. In another embodiment of the invention, the flexible element consists essentially of polyurethane or includes polyurethane.

In another embodiment of the invention, the flexible element is configured as a continuous seal or part of a continuous seal to seal a gap between the touchscreen and the display. In another embodiment of the invention, the flexible element is arranged on the edge of the touchscreen, so that it essentially does not cover a display surface of the display.

In another embodiment of the invention, the flexible element has at least one pair of intersecting grooves. In another embodiment of the invention, the grooves are sloped between about 30° and about 60°, especially about 45°, relative to the operating surface of the touchscreen. In another embodiment of the invention, at least two grooves have a common intersection site configured as a spherically bulged dome. In another embodiment of the invention, a transition between a groove and a flat region has a radius of curvature that is three to five times the thickness of a material, from which the groove is formed. In another embodiment of the invention, the flexible element is configured to prevent penetration of particles between the display and the touchscreen. In another embodiment of the invention, the flexible element is configured as a continuous seal or part of a continuous seal to seal a gap between the touchscreen and the display. In another embodiment of the invention, the flexible element includes an elastomer or consists essentially of an elastomer. In another embodiment of the invention, the flexible element includes a folded or telescoping region perpendicular to the movement direction.

In another embodiment of the invention, the interface is configured for wireless data transmission, for example, as a Bluetooth interface, 802.11, Ultra Wide Band, etc.

The aforementioned task is also solved by a vehicle with an input device, especially comprising one or more of the aforementioned features, in which the input device [includes] a housing, a display arranged in the housing for optical display of information, a touchscreen arranged above the display to input commands by touching an operating surface of the touchscreen, an actuator arranged in the housing to move the touchscreen or the housing in at least one direction, a control arranged in the housing to drive the actuator when the operating surface is touched in a region prescribed for haptic feedback, and an input device interface to output information via a command entered by touching the operating surface of the touchscreen.

In one embodiment of the invention, the vehicle includes a mounting device for releasable fastening of the input device. In another embodiment of the invention, the mounting device is integrated in the steering wheel, in a center console or in a dashboard or on a steering wheel, on a center console or on a dashboard.

In another embodiment of the invention, the vehicle includes a vehicle interface corresponding to the input device interface.

In another embodiment of the invention, the vehicle includes a function module operable by means of the input device, in which it is prescribed, in particular, that the function module can be operated by means of the input device when the input device is not arranged in the mounting device.

In another embodiment of the invention, the function module is an air conditioning unit, a navigation system, an infotainment system, a telephone interface and/or a telephone.

The aforementioned task is also solved by a vehicle with an input device, especially comprising one or more of the aforementioned features, in which the input device includes a display for optical display of information, a touchscreen arranged above the display to input commands by touching an operating surface of the touchscreen, an actuator to move the touchscreen in at least one direction and a control to drive the actuator when the operating surface is touched in a region prescribed for haptic feedback, in which the vehicle also includes a mounting device for releasable fastening of the input device.

In another embodiment of the invention, the input device also includes an input device interface for output of information via a command entered by touching the operating surface of the touchscreen.

In another embodiment of the invention, the mounting device is integrated in a steering wheel, in a center console or a dashboard, or arranged on a steering wheel, on a center console or on a dashboard.

In another embodiment of the invention, the vehicle also includes a vehicle interface corresponding to the input device interface.

For particularly economical use of the input devices with haptic feedback in the vehicle, production of input devices essentially of identical design, comprising especially one or more of the aforementioned features for application in a vehicle and for at least one additional application not prescribed for a vehicle, is prescribed, in which such an input device includes a display for optical display of information, a touchscreen arranged above the display to input commands by touching an operating surface of the touchscreen, an actuator to move the touchscreen in at least one direction and a control to drive the actuator when the operating surface is touched in a region prescribed for haptic feedback.

The weight of the touchscreen, according to the invention, is supposed to also include the weight of a rigid body firmly connected to the touchscreen. Particles, in the sense of the invention, include dust particles, in particular.

Vehicle according to the invention is especially a land vehicle, usable individually in traffic. Vehicles according to the invention are not particularly restricted to land vehicles with an internal combustion engine.

Touching of the touchscreen according to the invention can also or only be pressing on the touchscreen.

Additional advantages and details are apparent from the following description of practical examples.

DETAILED DESCRIPTION

Figure 1:
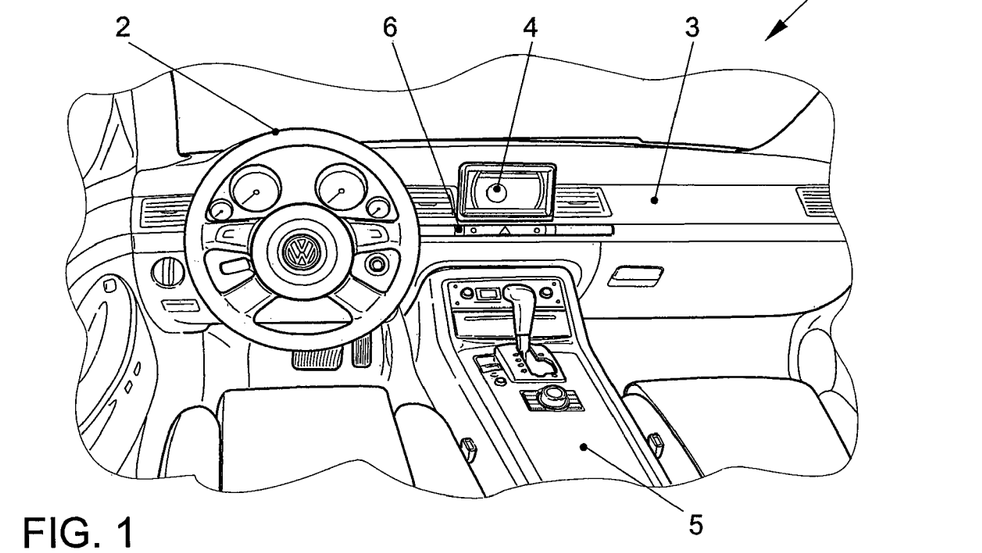
FIG. 1 shows a practical example for a cockpit of a vehicle.

FIG. 1 shows a practical example of a vehicle 1 in an internal view. A steering wheel 2 is arranged in the vehicle 1 beneath a dashboard 3. The dashboard 3 has an input device 4 arranged next to the steering wheel 2 for operation of the vehicle 1 or a function module of vehicle 1, for example, an air conditioner, navigation system, an infotainment system, a telephone interface and/or a telephone. As an alternative or in addition, an input device corresponding to the input device 4 can also be arranged in the steering wheel 2 or in a center console 5. To accommodate the input device 4, the vehicle 1 has a mounting device 6. It can be prescribed that the input device 4 can be removed from the mounting device 6 by the operator. It can also be prescribed that the vehicle 1 and the function module can be operated by the input device 4 when the input device is not arranged in the mounting device 6.

Figure 2:
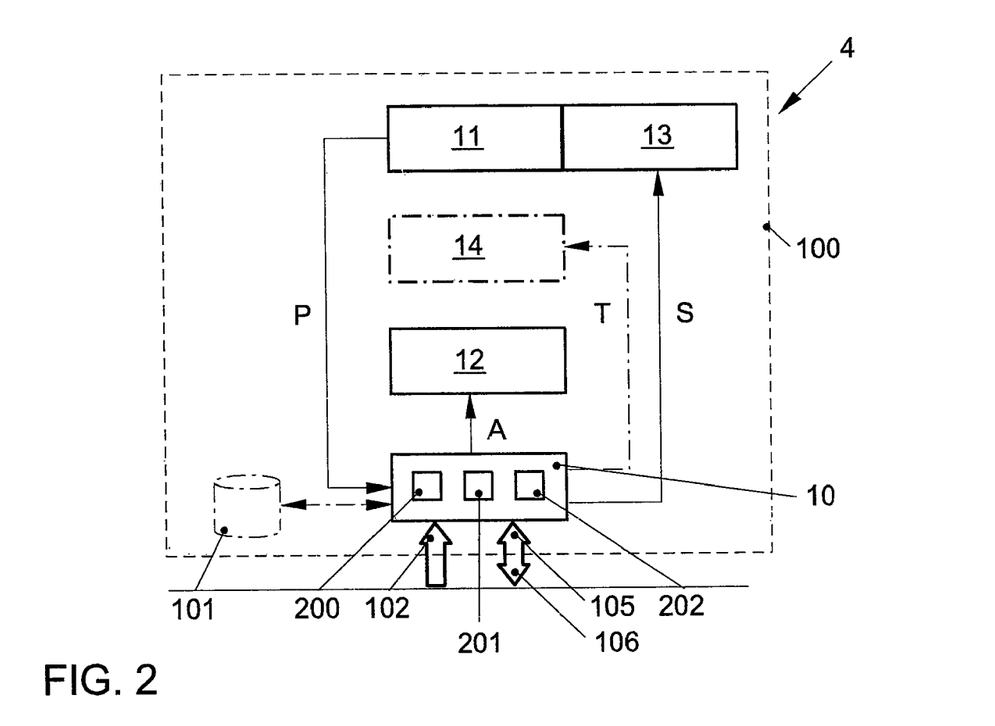
FIG. 2 shows a practical example of an input device with a connected control in a sketch.
Figure 5:
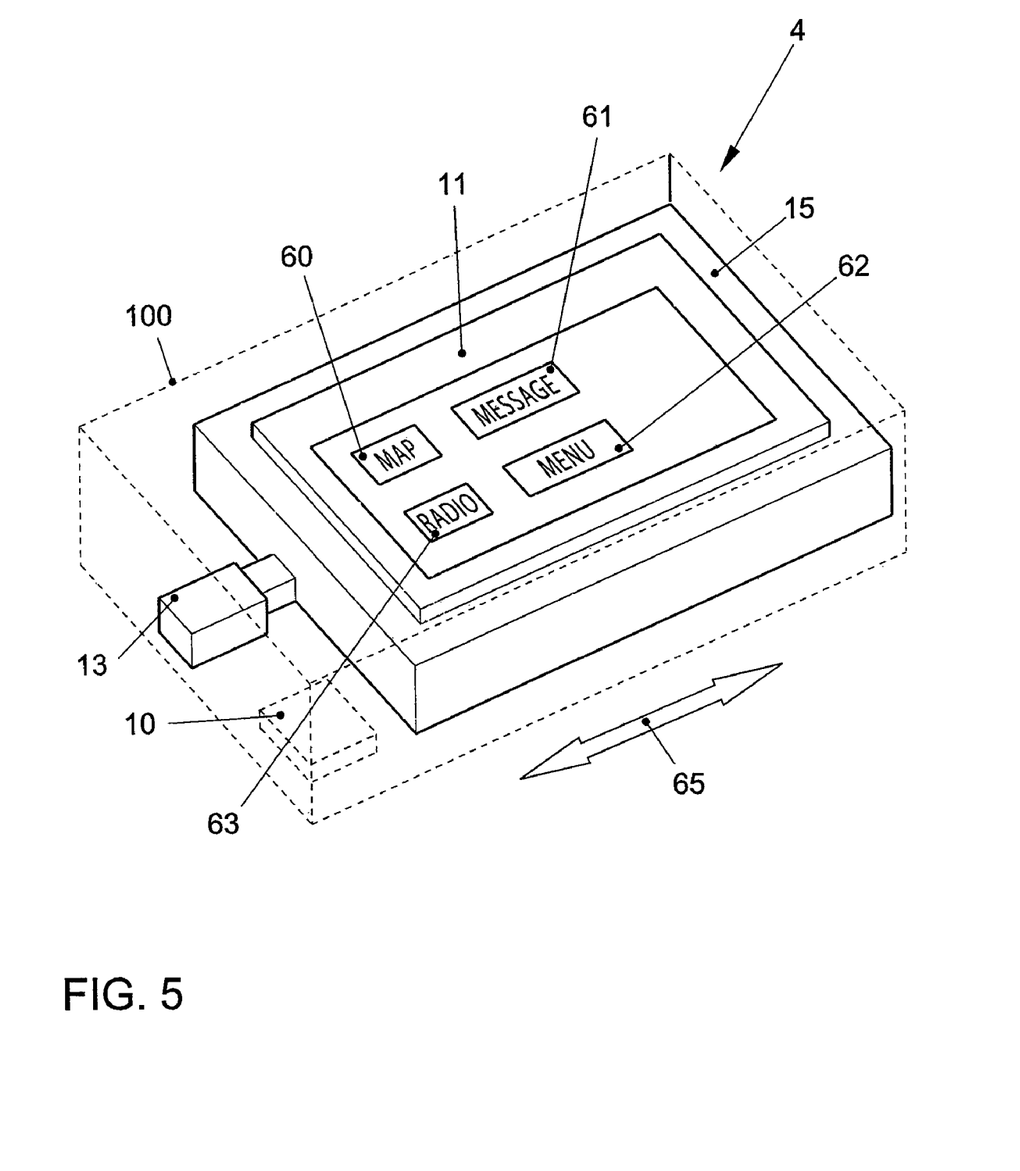
FIG. 5 shows the input device according to FIG. 2 in a perspective top view.
Figure 6:
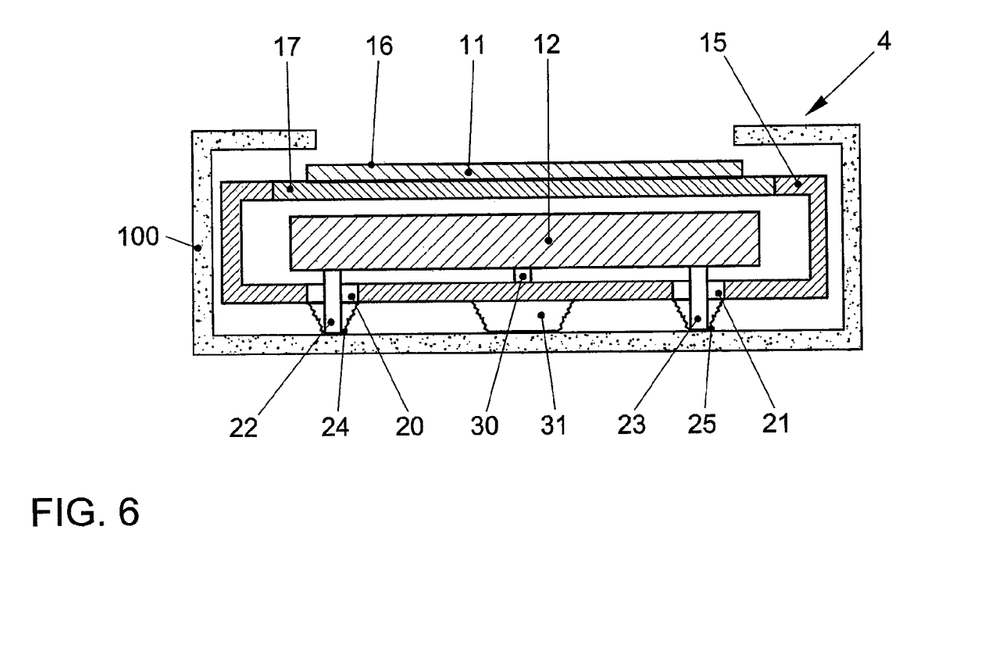
FIG. 6 shows the input device according to FIG. 2 in a cross-section.

FIG. 2 shows the input device 4 in a sketch. FIG. 5 shows the input device 4 in a perspective top view. FIG. 6 shows the input device 4 in a cross-section. The input device 4 includes a housing 1, an inner housing 15 arranged in housing 100, a display 12 arranged in the inner housing 15 for optical display of information, for example, the operating elements designated in FIG. 5 with reference numbers 60, 61, 62 and 63, a touchscreen 11 connected to the inner housing 15 and arranged above display 12 for input of commands by touching an operating surface 16 of touchscreen 11 and an actuator 13 to move the inner housing 15, and therefore touchscreen 11, relative to the display 12 in the direction of the double arrow 65.

A control 10, configured as a printed circuit board, is connected to the input device 4. The control 10 includes a circuit 200 to control the display, by means of which different information can be displayed on display 12 by output of a corresponding display signal A. The control 10 also includes a circuit 201 for evaluation of an output signal of touchscreen 11 and a position signal P, provided by touchscreen 11, which gives the position of touching of the operating surface 16 or pressing on the operating surface 16. In addition, the control 10 includes a circuit 202 to move the actuator 13 by output of an actuator control signal S. It can be prescribed that the input device 4 includes a layer 14 with adjustable transparency arranged between the touchscreen 11 and the display 12. In this case, it is prescribed that the transparency layer 14 with adjustable transparency is adjustable by means of control 10 by output of the transparency control signal T.

The input device 4 optionally includes a battery 101, especially replaceable. A charging circuit to charge battery 101 can also be implemented in control 10.

The input device 4 includes an input device interface 105, among other things, for output of information via a command entered by touching the operating surface of touchscreen 11. The vehicle 1 includes a vehicle interface 106 corresponding to the input device interface 105. The input device interface 105 could be configured for wireless data transmission, for example, as a Bluetooth interface, 802.11, Ultra Wide Band, etc. The input device 4 also includes a power supply interface 102, via which the control 10 and the input device 4 can be supplied with electrical power. The power supply can then occur in wireless fashion (for example, inductively).

Figure 3:
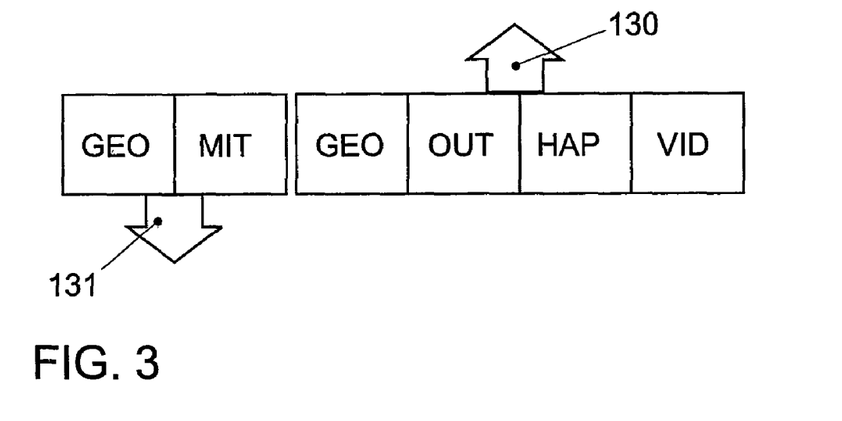
FIG. 3 shows a practical example of an interface'

The input device interface 105 can be configured in one embodiment according to an interface described in PCT/EP2005/008634, so that information exchange, depicted schematically in FIG. 3, occurs via the input device interface 105, in which the information allocated to arrow 130 denotes information that can be entered by the input device 4, and the information allocated to arrow 131 denotes information that can be output by the input device 4. The information that can be entered by the input device 4 includes geographic data GEO to define a point and/or a surface on the touchscreen 11, an output instruction OUT assigned to the geographic data GEO to indicate whether, during touching of touchscreen 11 and/or pressing of touchscreen 11 on the location of touchscreen 11 corresponding to geographic data GEO, a message MIT concerning touching of the touchscreen 11 and/or pressing touchscreen 16 is output by the input device 4, (optional) a haptic indication HAP assigned to the geographic information GEO to indicate the type of haptic reaction during touching of the touchscreens 16 and/or pressing of the touchscreen 11 and an video signal VID assigned to the geographic information GEO for display on a display 12.

The information that can be output by input device 4 includes message MIT concerning touching of the touchscreen 11 and/or pressing of the touchscreen 11 and optionally the corresponding geographic information GEO, where touching of the touchscreen 11 and/or pressing of the touchscreen 11 has occurred.

Figure 4:
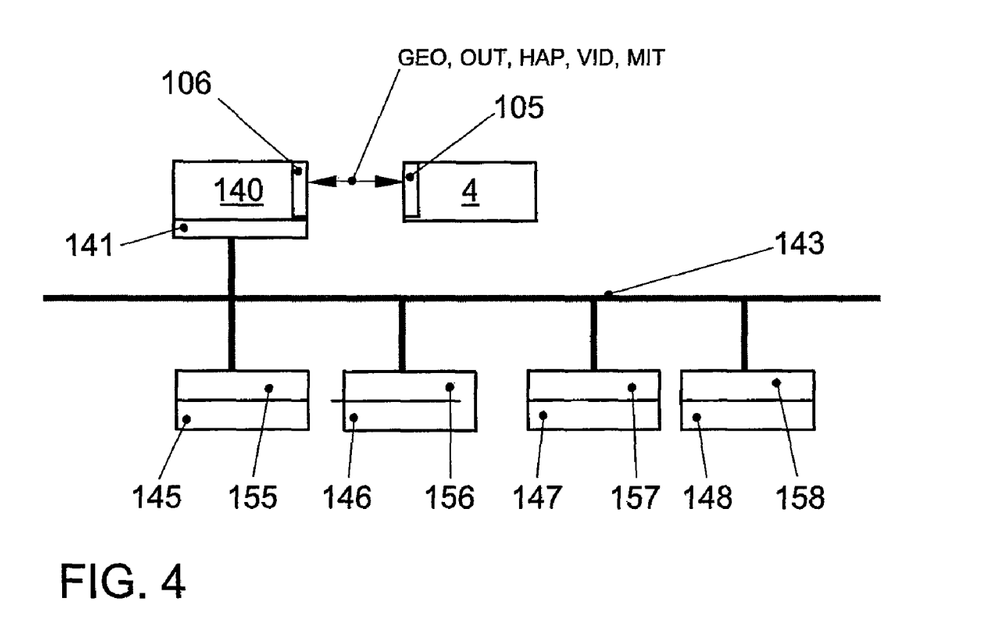
FIG. 4 shows a practical example for integration of an input device of a vehicle.

By means of input device 4, as shown in FIG. 4, an air conditioner 145 of vehicle 1, a navigation system 146 of vehicle 1, an infotainment system 147 of vehicle 1 and/or a telephone 148 in vehicle 1 can be operated. For this purpose, the input device 4 is connected to a display control device 140 (via the input device interface 105), which is connected via an interface 141 and via a bus system 143, in terms of data, to the air conditioner 145 or a control 155 assigned to the air conditioner 145, to the navigation system 146 or a control 156 assigned to the navigation system 146, to the infotainment system 147 or a control 157 assigned to the infotainment system 147 and/or to telephone 148 or a control 158 assigned to telephone 148. It can be communicated, by means of a protocol via interface 140, that an operating field for identification of a task to be executed, by means of the information concerning operation of the vehicle, includes a data field with a value for the information concerning operation of the vehicle and an ID field for identification of the information concerning operation of the vehicle.

As is apparent in FIG. 6, the touchscreen 11 is fastened to the inner housing 15 on the outside. The inner housing 15 is then transparent, at least in the region beneath touchscreen 11, designated with reference number 17. As an alternative, the touchscreen 11 can also be configured as part of the inner housing 15. The inner housing 15 includes four openings 20 and 21 covered by a flexible sleeve 24 and 25 (only two sleeves are visible in FIG. 6) (only two openings are visible in FIG. 6), through which the fastening elements 22 and 23 (only two fastening elements are visible in FIG. 6) are guided to fasten display 12 in housing 100. The inner housing 15 also includes another opening covered by another flexible sleeve 31, through which a feed line 30 to transmit the display signal A to display 12 (and optionally to the power supply of display 12) is guided. Flexible sleeves 24, 25, 26 27 and 31 can consist of an elastomer or include an elastomer. It is prescribed, in particular, that the flexibility of sleeves 24, 25, 26, 27 and 31 is adjusted to the weight of the inner housing 15, including touchscreen 11, so that the inner housing 15 (including touchscreen 11), in conjunction with the sleeves 24, 25, 26, 27 and 31, has a mechanical and natural frequency between 5 Hz and 150 Hz. The natural frequency is then adjusted, in particular, to actuator 13 or actuator 13 is chosen according to the natural frequency.

Figure 7:
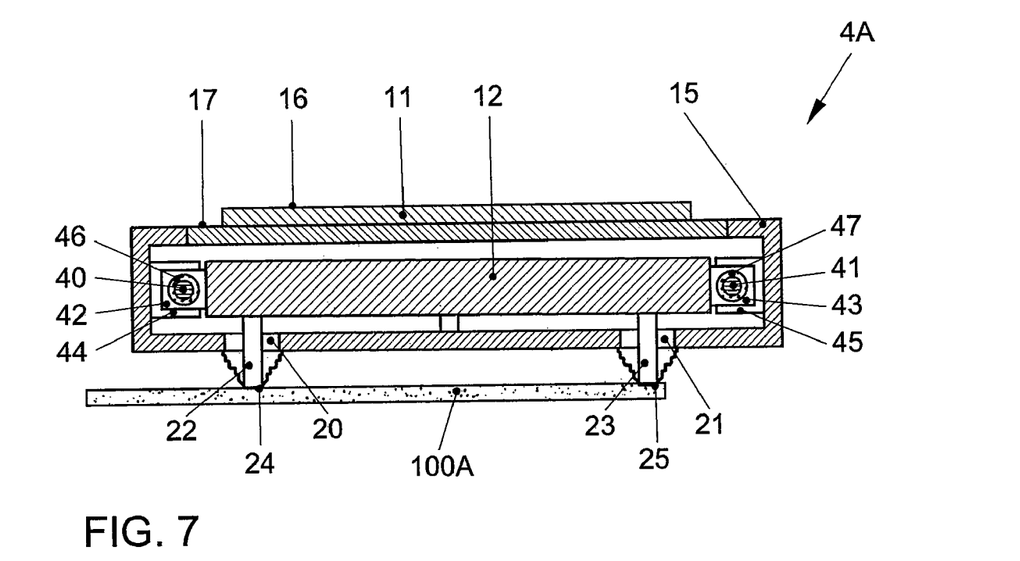
FIG. 7 shows a modified embodiment of the input device according to FIG. 2 in a cross-section.

FIG. 7 shows an input device 4A, modified relative to the input device 4, in a cross-section, in which the same reference numbers denote the same or equivalent elements as in FIGS. 2, 5 and 6. The input device 4A includes connection elements for shape-mated connection of inner housing 15 to display 12, so that the inner housing 15 can only be moved along a straight line relative to display 12. For this purpose a connection element includes at least one fastening element 44 or 45 connected to the inner housing 15 for fastening of a rod 40 or 41. In addition, a connection element includes at least one sliding element 42 or 43 connected to the display 12 with at least one sliding bearing 46 or 47, by means of which the sliding element 42 or 43 can be moved along rod 40 or 41. It can also be prescribed that the sliding element 42 or 43 is connected to the inner housing 15 and the fastening element 44 or 45 to display 12 (fixed). The fastening elements 22 and 23 are connected in the input device 4A to a locking frame 100A, by means of which the input device 4A can be releasably locked in mounting device 6. It can be prescribed that the control 10 and/or the actuator 13, in one embodiment of the input device 4A, are arranged in the inner housing 15.

Figure 8:
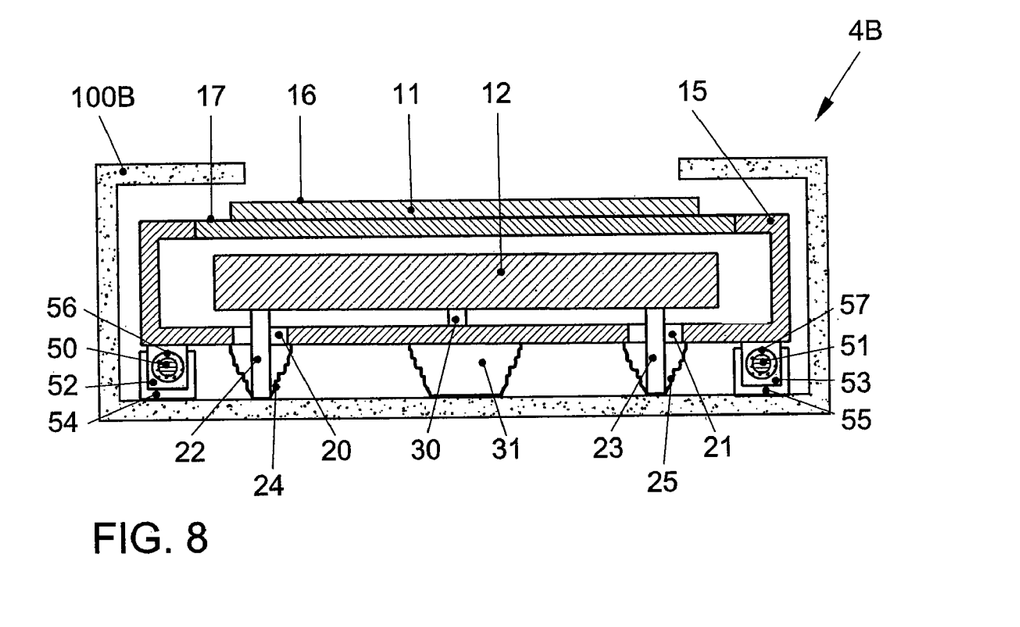
FIG. 8 shows another modified embodiment of the input device according to FIG. 2 in a cross-section.

FIG. 8 shows another input device 4B, modified relative to the input device 4, in a cross-section, in which the same reference numbers denote the same or equivalent elements as in FIGS. 2, 5 and 6. The input device 4B includes connection elements for shape-mated connection of the inner housing 15 to display 12, so that the inner housing 15 can only be moved along the straight line relative to display 12. For this purpose, a connection element includes at least one fastening element 54 or 55 connected or connectable to the steering wheel 2 or dashboard 3 for fastening of a rod 50 or 51. In addition, the connection element includes at least one sliding element 52 or 53 connected to the inner housing 15 with at least one sliding bearing 56 or 57, by means of which the sliding element 52 or 53 can be moved along rod 50 or 51. The fastening elements 22 and 23 and sliding elements 52 and 53 are fastened on the inside of a housing 100B, corresponding to housing 100.

Figure 9:
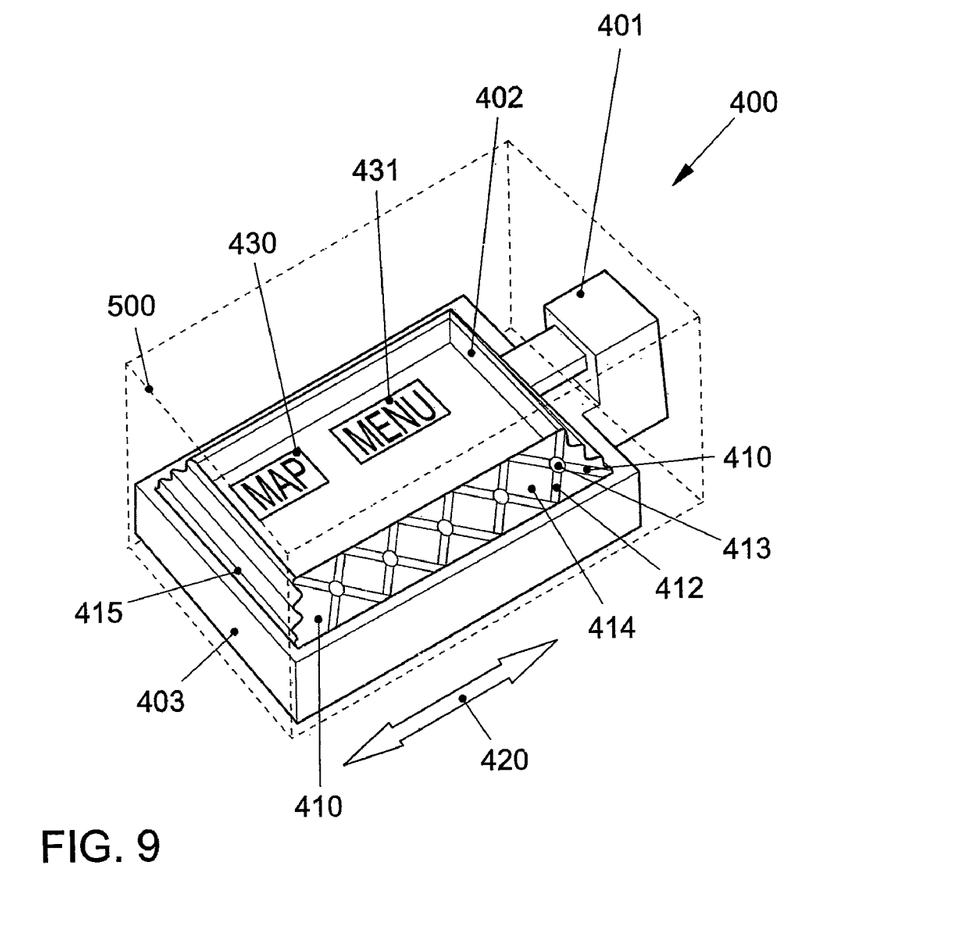
FIG. 9 shows another practical example of an input device in a perspective top view.

FIG. 9 shows another practical example of an input device 400, for use instead of the input device 4 in vehicle 1, in a perspective, top view. The input device 400 includes a display 403 arranged in housing 500 for optical display of information, for example, with reference numbers 430 and 431 in FIG. 9, a touchscreen 402 connected to display 403 and arranged above display 403 to input commands by touching of the operating surface of the touchscreen 402, and an actuator 401 arranged in housing 500 to move the touchscreen 402 relative to display 403. A gap is then provided between touchscreen 402 and display 403, so that the touchscreen 402 can be moved relative to display 403 without mechanical surface wear. The input device 400 includes a control (not shown) corresponding to control 10. Touchscreen 402 can include a support, for example, a transparent one, including a touchscreen in the narrow sense, which is arranged on the support.

A flexible element 410 to prevent penetration of dust particles (into the gap) between the display 403 and touchscreen 402 is arranged between display 403 and touchscreen 402. For this purpose, the flexible element 410 is arranged continuously on the edge of touchscreen 402. The flexible element 410 has a rigidity adjusted to the weight of touchscreen 402, so that the touchscreen 402, in connection with the flexible element 410, has a mechanical natural frequency between 5 Hz and 150 Hz in the movement direction (i.e., in the present practical example, in the direction of double arrow 420).

The flexible element 410 consists essentially of an elastomer and includes—at least in the movement direction (i.e., in the present practical example, in the direction of double arrow 420)—essentially linearly extending grooves 411 and 412 that intersect in pairs, so that two grooves 411 and 412 have a common intersection point 413 configured as a spherically bulged dome. The grooves 411 and 412 are sloped about 45° relative to the operating surface of touchscreen 402. The transition between one groove 411 or 412 and a flat region 414 has a radius of curvature that amounts to three to five times the thickness of a material, from which the groove 411 and 412 is formed. Appropriate configurations for a region of the flexible element 410 configured in this way can be deduced from U.S. Pat. No. 4,044,186 (incorporated by reference), as well as the corresponding DE 2 349 499 (incorporated by reference).

Figure 10:
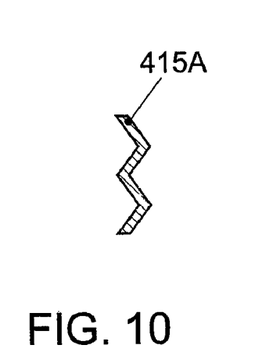
FIG. 10 shows a practical example of a folded or telescoped region.
Figure 11:
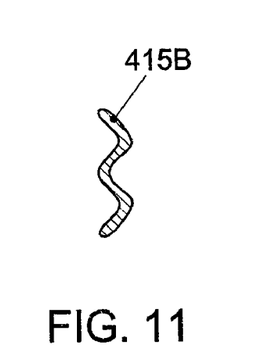
FIG. 11 shows another practical example of a folded or telescoped region.
Figure 12:
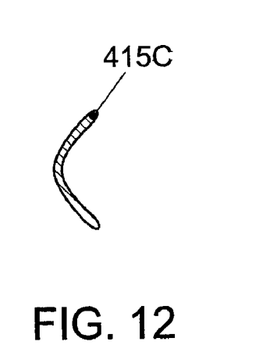
FIG. 12 shows another practical example of a folded or telescoped region.

The flexible element 410 includes a folded or telescoping region 415, perpendicular to the movement direction (i.e., in the present practical example, perpendicular to the direction of double arrow 420). Additional practical examples of the folding or telescoping region 415A, 415B and 415C are shown in FIG. 10, FIG. 11 and FIG. 12.

Figure 13:
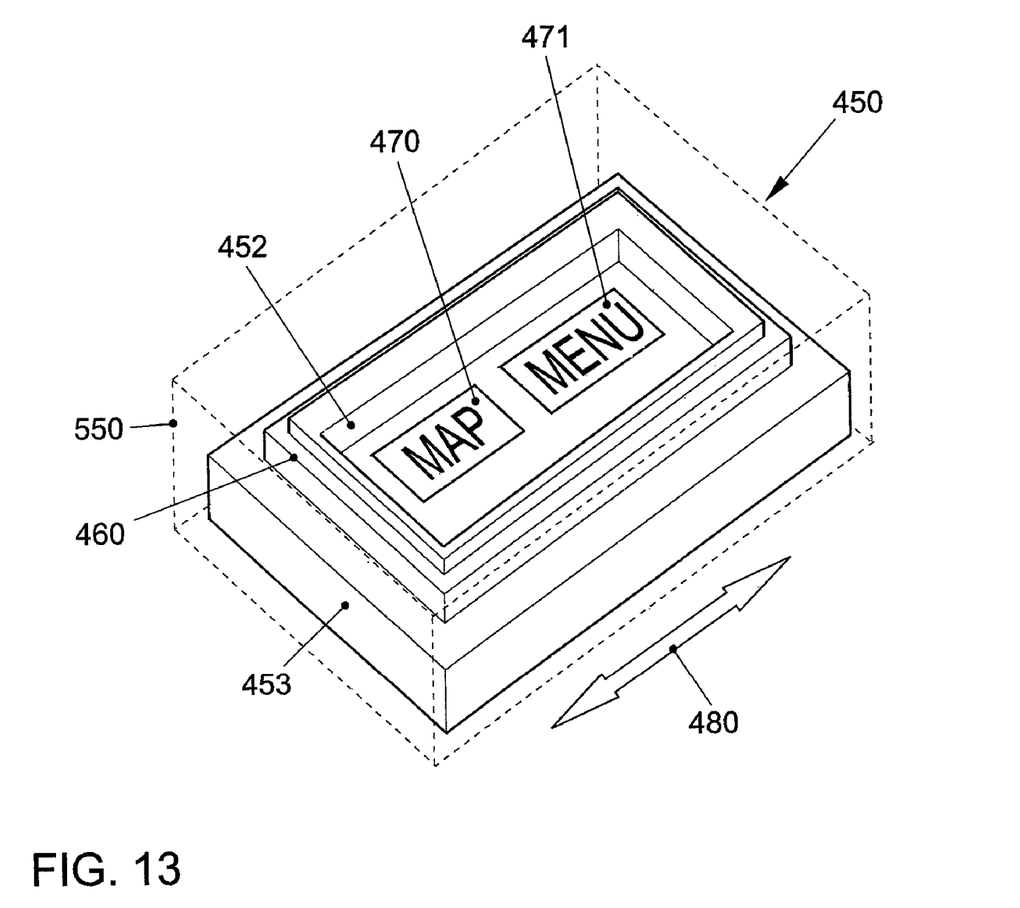
FIG. 13 shows another practical example of an input device in a perspective top view.

FIG. 13 shows another practical example of an input device 450, for use instead of input device 4, in a perspective, top view. The input device 450 includes a display 453 arranged in housing 550 for optical display of information, for example, the operating elements denoted with reference numbers 470 and 471 in FIG. 13, a touchscreen 452 connected to display 453 and arranged above display 453 for input of commands by touching an operating surface of the touchscreen 452 and an actuator corresponding to the actuator 401 (but not shown in FIG. 13) arranged in housing 500 for movement of the touchscreen 452 relative to the display 453. A gap is provided between the touchscreen 452 and display 453, so that the touchscreen 452 can be moved relative to display 453 without mechanical surface wear. The input device 450 includes a control (not shown) corresponding to control 10. The touchscreen 452 can include a transparent support, including the touchscreen in a narrow sense, which is arranged on the support.

A flexible foamed element 460 to prevent penetration of dust particles between the display 453 and touchscreen 452 is arranged between display 453 and touchscreen 452. For this purpose, the flexible foamed element 460 is arranged continuously on the edge of touchscreen 452. The flexible foamed element 460 has a rigidity adjusted to the weight or touchscreen 452, so that the touchscreen 452, in connection with the flexible foamed element 460, has a mechanical natural frequency between 5 Hz and 150 Hz in the movement direction (i.e., in the present practical example, in the direction of double arrow 480). The flexible foamed element 460 consists essentially of polyurethane.

Figure 14:
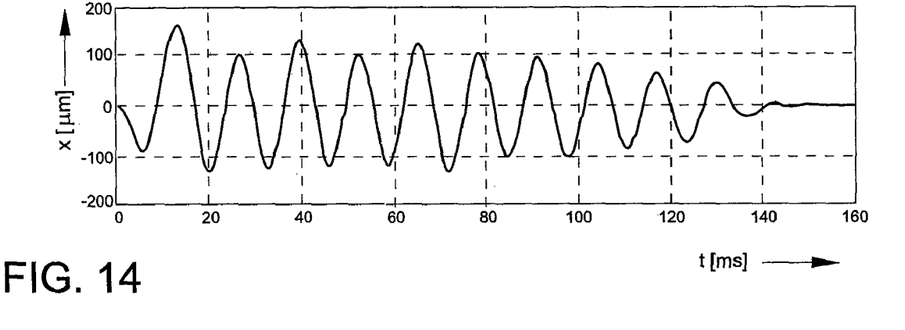
FIG. 14 shows a practical example of a deflection of a touchscreen.
Figure 15:
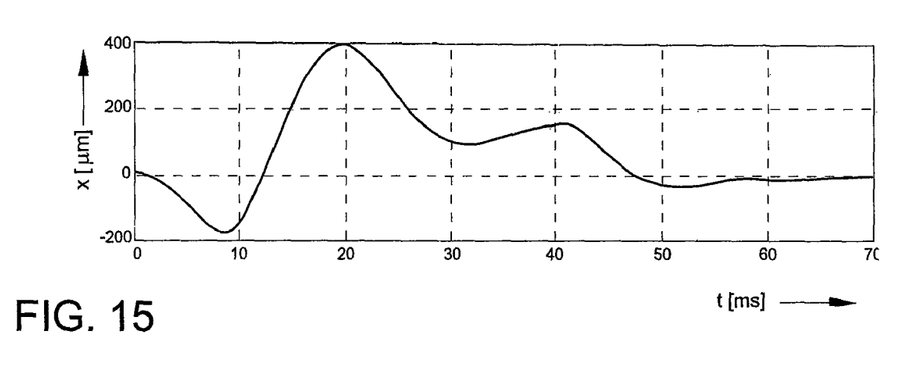
FIG. 15 shows another practical example of a deflection of a touchscreen.
Figure 16:
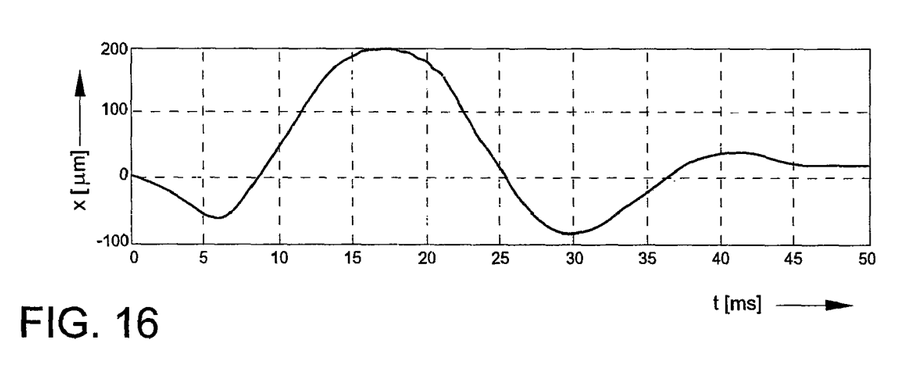
FIG. 16 shows another practical example of a deflection of a touchscreen.

FIG. 14, FIG. 15 and FIG. 16 show practical examples of a deflection d of touchscreen 11, 402, 452 in the direction of double arrows 65, 420 and 480 for implementation of tactile or haptic feedback. If, for example, an operating element 60, 61, 62, 63, 430, 431, 470, 471, depicted by the display 12, 402, 452, is operated, the control 10 or a control corresponding to control 10 generates a control signal S to deflect touchscreen 11, 402, 452 corresponding to a deflection d, shown versus time t in FIG. 14, FIG. 15 and FIG. 16.

Figure 17:
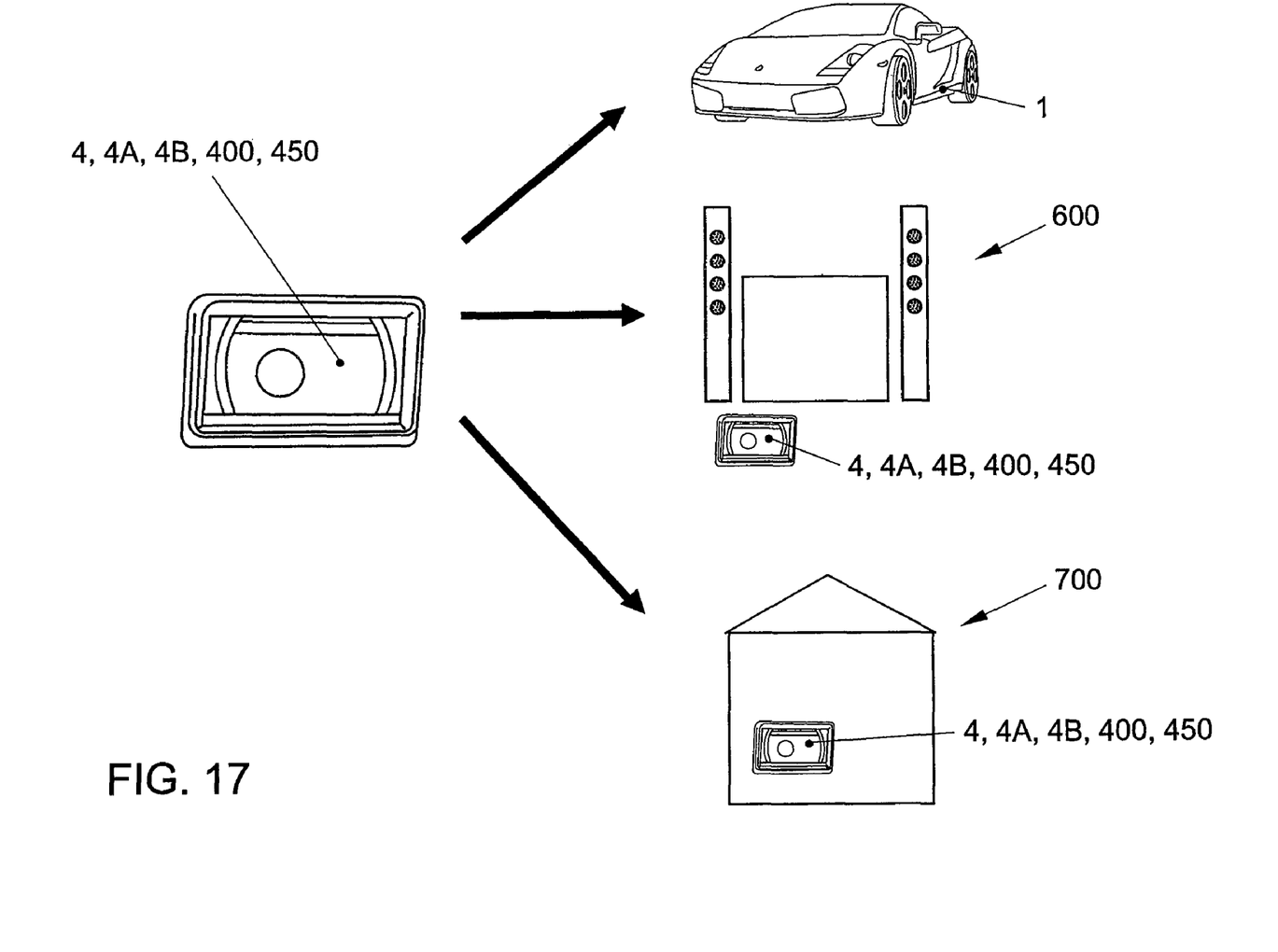
FIG. 17 shows the production of input devices that are essentially the same design for use in a vehicle and for at least one additional application not prescribed for a vehicle.

FIG. 17 shows the production of input devices of essentially the same design as input device 4, 4A, 4B, 400 or 450 for use in a vehicle and for two additional applications not prescribed for a vehicle. In a typical embodiment, it is prescribed that input devices of essentially the same design corresponding to input device 4, 4A, 4B, 400 or 450 are used either in a vehicle, like vehicle 1, as a remote control for a home cinema system 16 or as a man-machine interface 700 for building control. In this way, a situation can be achieved, in which the same input device can be used by an operator for different purposes.

The elements and spacings in FIGS. 2 to 13 and 17 are not necessarily drawn true to scale, in the interest of simplicity and clarity. For example, the orders of magnitude of some elements and spacings of FIGS. 2 to 13 and 17 are exaggerated relative to other elements and spacings in FIGS. 2 to 13, as well as 17, in order to improve understanding of the practical examples of the present invention.

LIST OF REFERENCE NUMBERS

1 Vehicle
2 Steering wheel
3 Dashboard
4, 4A, 4B, 400, 450 Input device
5 Center console
6 Mounting device
10 Control
11, 402, 452 Touchscreen
12, 403, 453 Display
13, 401 Actuator
14 Layer with adjustable transparency
15 Inner housing
16 Operating surface
17 Region
20, 21 Opening
22, 23 Fastening element
24, 25, 31 Sleeve
30 Feed line
40, 41, 50, 51 Rod
42, 43, 52, 53 Sliding element
44, 45, 54, 55 Fastening element
45, 47, 56, 57 Sliding bearing
60, 61, 62, 63, 430,
431, 470, 471 Operating element
65, 420, 480 Double arrow
100, 100B, 500, 550 Housing
100A Locking frame
101 Battery
102 Power supply interface
105 Input device interface
106 Vehicle interface
130, 131 Arrow
140 Display control unit
141 Interface
143 Bus system
145 Air conditioner
146 Navigation system
147 Infotainment system
148 Telephone
155, 156, 157, 158 Control
200, 201, 202 Circuit
410 Flexible element
411, 412 Groove
413 Intersection site
414 Flat region
415, 415A,
415B, 415C Folded or telescoping region
460 Flexible foamed element
600 Home cinema system
700 Building control
A Display signal
d Deflection
GEO Geographic information
HAP Haptic information
MIT Message concerning touching of the touchscreen and/or pressing on the touchscreen
OUT Output instruction
P Position signal
S Actuator control signal
t Time
T Transparency control signal
VID Video signal

The invention claimed is:

1. Input device comprising:
a housing;
an inner housing directly or indirectly coupled to the housing;
a display for optical display of information, the display being arranged in the inner housing and coupled to the housing by one or more fastening elements extending through one or more openings in the inner housing;

a touchscreen attached to the inner housing at a location above the display to input commands by touching an operating surface of the touchscreen;

an electronic actuator arranged at least partly in the housing, the electronic actuator configured to move the touchscreen or housing in at least one direction parallel to the operating surface of the touchscreen according to received control signals;

an electronic control arranged in the housing to generate the control signals to drive the actuator when the operating surface is touched in a region prescribed for haptic feedback; and an interface for output of information via a command entered by touching the operating surface of the touchscreen.

2. An input device according to claim 1, wherein the inner housing is arranged in the housing.

3. An input device according to claim 2, wherein the inner housing is movable relative to the display.

4. An input device according to claim 1, further comprising:

a flexible element arranged between the display and touchscreen to prevent penetration of particles between the display and touchscreen.

5. An input device according to claim 4, wherein the flexible element has a rigidity adjusted to the weight of the touchscreen, so that the touchscreen, in connection with the flexible element, has a mechanical and natural frequency between 5 Hz and 150 Hz.

6. An input device according to claim 5, wherein the flexible element is arranged on the edge of the touchscreen, so that it essentially does not cover a display surface of the display.

7. An input device according to claim 4, wherein the flexible element is foamed.

8. An input device according to claim 7, wherein the flexible element essentially consists of polyurethane.

9. An input device according to claim 7, wherein the flexible element is arranged on the edge of the touchscreen, so that it essentially does not cover a display surface of the display.

10. An input device according to claim 4, wherein the flexible element has at least one pair of intersecting grooves.

11. An input device according to claim 10, wherein the flex element is arranged on the edge of the touchscreen, so that it essentially does not cover the display surface of the display.

12. An input device according to claim 10, wherein the grooves are sloped about 30° and about 60° relative to the operating surface of the touchscreen.

13. An input device according to claim 10, wherein at least two grooves have a common intersection site configured as a spherically bulged dome.

14. An input device according to claim 10, wherein the interface is configured for wireless data transmission.

15. An input device according to claim 10, wherein the interface is a Bluetooth interface.

16. An input device according to claim 1, further comprising:

a circuit for evaluation of an output signal of the touchscreen.

17. An input device according to claim 1, further comprising:

a circuit for control of the display.

18. An input device according to claim 1, wherein the control is configured as a printed circuit board.

19. An input device according to claim 18, wherein the printed circuit board comprises:

a circuit for evaluation of an output signal of a touchscreen.

20. An input device according to claim 18, wherein the printed circuit board comprising:

a circuit for control of the display.

21. A vehicle with an input device, the input device comprising:

a housing;

an inner housing directly or indirectly coupled to the housing;

a display for optical display of information, the display being arranged in the inner housing and coupled to the housing by one or more fastening elements extending through one or more openings in the inner housing;

a touchscreen attached to the inner housing at a location above the housing for input of commands by touching an operating surface of the touchscreen;

an electronic actuator arranged in the housing, the electronic actuator configured to move the touchscreen or housing in at least one direction parallel to the operating surface of the touchscreen according to received control signals;

an electronic control arranged in the housing to generate the control signals to control the actuator when the operating surface is touched in a region prescribed for haptic feedback; and an input device interface for output of information via a command entered by touching the operating surface of the touchscreen.

22. A vehicle according to claim 21, further comprising:

a mounting device for releasable fastening of the input device.

23. A vehicle according to claim 22, wherein the mounting device is integrated in a steering wheel, in a center console or in a dashboard.

24. A vehicle according to claim 22, wherein the mounting device is arranged on a steering wheel, on a center console or on a dashboard.

25. A vehicle according to claim 21, further comprising:

a vehicle interface corresponding to the input device interface.

26. A vehicle according to claim 21, further comprising:

a function module operable by means of the input device.

27. A vehicle according to claim 26, wherein the function module can be operated by means of the input device when the input device is not arranged in the mounting device.

28. A vehicle according to claim 27, wherein the function module is an air conditioner, a navigation system, an infotainment system, a telephone interface or a telephone.

29. A vehicle comprising:

an input device, the input device comprising:

a housing;

an inner housing;

a display for optical display of information, the display being arranged in the inner housing, and the display being physically separated from the housing but coupled to the housing by one or more fastening elements;

a touchscreen attached to the inner housing at a location above the display for input of commands by touching an operating surface of the touchscreen;

an electronic actuator configured to move the touchscreen in at least one direction parallel to the operating surface of the touchscreen according to received control signals, and an electronic control to generate the control signals to control the actuator when the operating surface is touched in a region prescribed for haptic feedback; and a mounting device for releasable fastening of the input device.

30. A vehicle according to claim 29, further comprising:

an input device interface for output of information via a command entered by touching the operating surface of the touchscreen.

31. A vehicle according to claim 29, wherein the mounting device is integrated in the steering wheel, in a center console or in the dashboard.

32. A vehicle according to claim 29, wherein the mounting device is arranged on a steering wheel, on a center console or on a dashboard.

33. A vehicle according to claim 30, further comprising:

a vehicle interface corresponding to the input device interface.

34. A method for producing input devices of essentially the same design for use in a vehicle and for at least one additional application not prescribed for a vehicle, comprising:

providing a display for optical display of information, the display being arranged in an inner housing and coupled to an outer housing by one or more fastening elements extending through one or more openings in the inner housing;

arranging a touchscreen secured to the inner housing at a location above the display to input commands by touching an operating surface of the touchscreen;

providing an electronic actuator to move the touchscreen in at least one direction parallel to the operating surface of the touchscreen according to received control signals; and providing an electronic control to generate the control signals to drive the actuator when the operating surface is touched in a region prescribed for haptic feedback.

\* \* \* \* \*